United States Patent [19]

Teraoka

[11] Patent Number: 4,631,978
[45] Date of Patent: Dec. 30, 1986

[54] DEVICE FOR THE DISTRIBUTION OF MOTIVE POWER

[75] Inventor: Masao Teraoka, Tochigi, Japan

[73] Assignee: Tochigifujisangyo Kabushikigaisha, Tochigi, Japan

[21] Appl. No.: 599,478

[22] Filed: Apr. 12, 1984

[30] Foreign Application Priority Data

Apr. 13, 1983 [JP] Japan .................................. 58-63787

[51] Int. Cl.$^4$ .................. F16H 1/44; F16H 37/06; F16H 37/08; B60K 17/352
[52] U.S. Cl. .................................... 74/710.5; 74/701; 74/665 GC; 180/250
[58] Field of Search ...................... 74/710, 710.5, 711, 74/713, 694, 695, 700, 701, 705, 665 GB, 665 GC; 180/233, 247, 248, 249, 250

[56] References Cited

U.S. PATENT DOCUMENTS

| | | | | |
|---|---|---|---|---|
| 3,848,691 | 11/1974 | Dolan | .................................. | 180/250 |
| 3,915,032 | 10/1975 | Ottemann | .............................. | 74/711 |
| 4,232,569 | 11/1980 | Hauser et al. | ......................... | 74/701 |
| 4,415,058 | 11/1983 | Suzuki | ................................. | 180/247 |
| 4,432,431 | 2/1984 | Russell | ................................ | 180/248 |

FOREIGN PATENT DOCUMENTS

| | | | | |
|---|---|---|---|---|
| 708438 | 8/1962 | Canada | .................................. | 180/248 |
| 554970 | 1/1957 | Italy | ..................................... | 74/711 |
| 63523 | 4/1983 | Japan | .................................... | 180/248 |
| 787462 | 12/1957 | United Kingdom | ................ | 180/247 |

Primary Examiner—Kenneth J. Dorner
Assistant Examiner—Stephen Andrews
Attorney, Agent, or Firm—Aaron B. Karas

[57] ABSTRACT

A device for the distribution of motive power having a compact size and a light weight is shown. The device comprises a hollow shaft receiving input power, a pinion shaft with a pinion gear rotatably supported thereon, which is meshed with a pair of side gear, one of the side gear integrally formed with a front wheel drive shaft, the other side gear integrally formed with differential case coupled to a rear wheel drive shaft. Thereby it is possible to maintain the height above ground of the rear wheel drive shaft.

3 Claims, 2 Drawing Figures

DEVICE FOR THE DISTRIBUTION OF MOTIVE POWER

BACKGROUND OF THE INVENTION

This invention relates to a device for distributing motive power between the front and rear wheels of a four wheel drive vehicle.

An example of an existing type of device for such distribution of motive power is shown in FIG. 1. That is to say, the hollow shaft 101, which receives input from the engine which is the device for driving the vehicle (the engine is outside of this figure), is supported inside the transfer case 103 in such a way that it is free to rotate, and is solidly coupled to the differential case 107 of the differential device 105 on its output side. The pinion shaft 109 is fixed to the differential case 107; the pinion gear 111 inside the differential case 107 is supported by the pinion shaft 109 in such a way that it is free to turn. The pinion gear 111 is meshed with a pair of side gears 113 which are opposite each other with respect to the center of the above-mentioned hollow shaft 101. One of the side gears 113 is coupled to one end of the front wheel drive shaft 115; the front wheel drive shaft 115 passes through the center of the above-mentioned hollow shaft 101 and extends to the front wheels which are off of the figure. The other side gear 113 is coupled to one end of the intermediate shaft 117 which is concentric with the above-mentioned hollow shaft 101. The other end of the intermediate shaft 117 is supported by the transfer case 103 through the bearing 119. The intermediate gear 121 is fixed to the intermediate shaft 117, and in turn the intermediate gear 121 is meshed with the input gear 125 of the rear wheel drive shaft 123. The rear wheel drive shaft 123 is located above the intermediate shaft 117 and is supported by the transfer case 103 in such a manner that it is free to rotate, and extends to the rear wheels which are off the figure. Meanwhile, the first lock member 129, which has the splines 127 on its outer circumference, is fixed to the above-mentioned intermediate shaft 117, while the second lock member 133, which has splines 131 of the same diameter as the splines 127, is fixed to the above-mentioned differential case 107. The splines 127 are meshed with the sleeve 135; by means of sliding motion, it is possible for both the splines 127 and the splines 131 to be meshed at the same time.

Input which is received from the engine is distributed by the differential case 107, the pinion shaft 109, the pinion gear 111 and the side gears 113, causing both the front wheel drive shaft 115, and the intermediate shaft 117, intermediate gear 121, input gear 125 and rear wheel drive shaft 123, to rotate. These drive shafts in turn transmit power to the front wheels and the rear wheels, which are off the figure.

When a difference arises between the rotation rates of the front wheel drive shaft 115 and the rear wheel drive shaft 123, the differential device 105 acts to maintain smooth transmission of power. When a differential lock is necessary, the sleeve 135 is caused to slide by the operation of a differential lock lever, which is off the figure next to the driver's seat, so that both splines 127 and 131 are meshed at the same time, causing the first lock member 129 and the second lock member 133 to be joined together as one body. In addition, since the rear wheel drive shaft 123 is located above the hollow shaft 101 and the intermediate shaft 117 which is concentric with it, it is easy to maintain the height above ground of the rear wheel drive shaft 123 which extends a long distance to the rear of the vehicle. This feature is particularly advantageous in off-road operation.

However, in this type of conventional power distribution device, the intermediate shaft 117 which has the intermediate gear 121 must be provided, and the transfer case 103, which extends along the length of the vehicle from front to rear, becomes extremely long. This in turn means that in order to provide a power distribution device, severe restrictions must be placed on the design of the other parts, and one consequence of this is an increase of the overall weight. In addition, the number of parts is increased by the addition of the intermediate shaft 117 and the bearing 119 which connects it to the transfer case 103, which makes assembly and supervision of parts more complicated.

In contrast to this type, there are also transmission systems in which the rear wheel drive shaft is not located above the intermediate shaft 117, but the intermediate shaft 117 itself is used as the rear wheel drive shaft. In this case the intermediate gear 121 becomes unnecessary and the total length of the system from front to rear of the vehicle is reduced by the length of the intermediate gear, and the number of parts is reduced. However, the height above ground of the rear wheel drive shaft, which extends a long distance to the rear of the vehicle, cannot be maintained, causing a reduction in performance off roads which tends to defeat the purpose of the four wheel drive vehicle.

SUMMARY OF THE INVENTION

This invention was conceived in consideration of the points discussed above. It provides a power distribution device which makes it possible to both maintain the height above ground of the rear wheel drive shaft and make the entire system compact and light weight, with easy parts supervision.

In order to achieve this objective, the transmission system is designed as follows. Power from the engine is imput to a hollow shaft. At its output end this hollow shaft is connected to a pinion shaft. A pinion gear is supported on this pinion shaft in such a manner that it can rotate freely. A pair of side gears are meshed with this pinion gear. The front wheel drive shaft is solidly coupled to one side gear and passes through the center of the above-mentioned hollow shaft. A differential case is formed in one piece with the other side gear and encloses the above-mentioned pinion shaft, pinion gear and side gear. The rear wheel drive shaft is coupled to the differential case through some means of power transmission and is located above the above-mentioned front wheel drive shaft.

DETAILED DESCRIPTION OF THE PREFERRED EMBODIMENT

Figure 2:
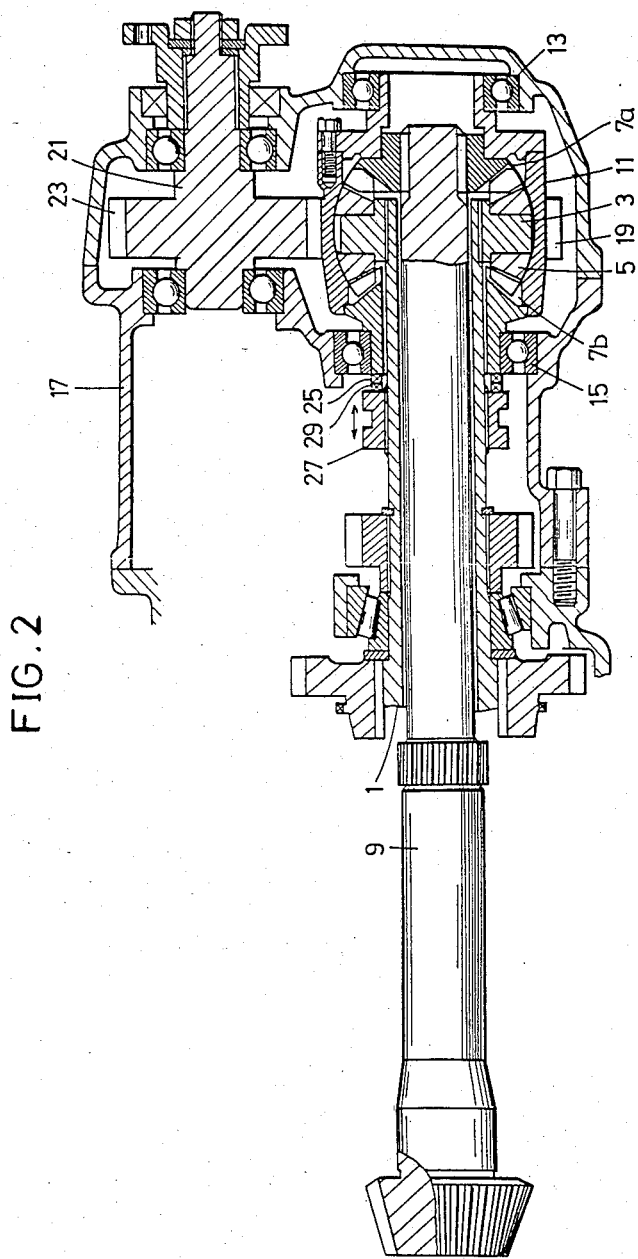
FIG. 2 is a cross-sectional view of a power transmission system containing a power distribution device which is designed in accordance with the present invention. Part of the transmission system is omitted from the drawing.

Referring now to FIG. 2, an embodiment of this invention is shown.

Figure 1:
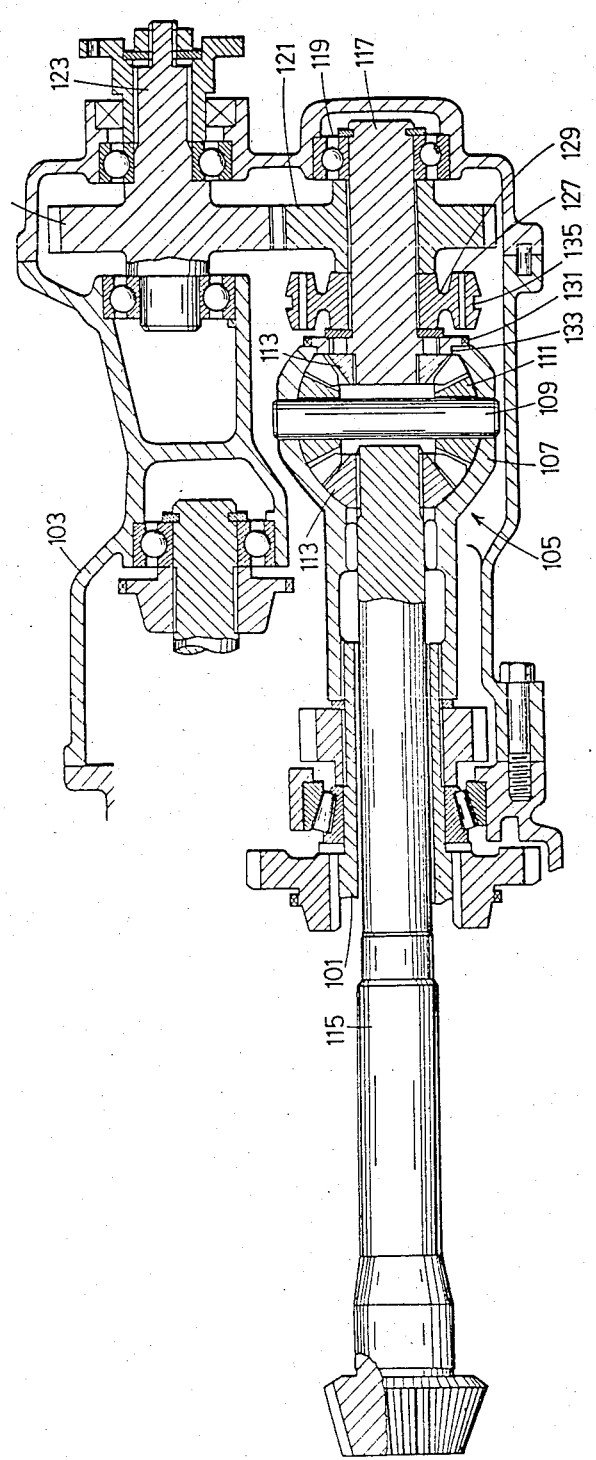
FIG. 1 is a cross-sectional view of a conventionally designed power transmission system containing a power distribution device. Part of the transmission system is omitted from the drawing.

As in the example shown in FIG. 1, the pinion shaft 3 is fixed to the output end of the hollow shaft 1. The pinion gear 5 is supported on the pinion shaft 3 in such a manner that it is free to rotate. As in the example shown in FIG. 1, the pair of side gears 7a and 7b are meshed to the pinion gear 5. Among the pair of side gears 7a and 7b, in the direction running from forward to rear of the vehicle (the left-right direction in the figure) the rear side gear 7a is coupled solidly to the front wheel drive shaft 9, just as in the example shown in FIG. 1. The side gear that is more forward in the direction running from forward to rear of the vehicle, side gear 7b, is formed in one piece with the differential case 11. This differential case 11 encloses the above-mentioned pinion shaft 3, pinion gear 5 and side gears 7a and 7b. Both the forward and rear ends of the differential case 11 are supported on the transfer case 17 through the bearings 13 and 15 in such a manner that they are free to rotate. Consequently, the differential case 11, which is a heavy object and at the same time receives a powerful reaction force from the meshed gears, can be strongly supported. The drive gear 19 is located along the outer circumference of the above-mentioned differential case 11 and is meshed to the input gear 23 of the rear wheel drive shaft 21. Consequently, the rear wheel drive shaft 21 is coupled to the differential case 11 through the drive gear 19 and the input gear 23, which form a means of power transmission. The rear wheel drive shaft 21 is located above the above-mentioned front wheel drive shaft 9 and is supported on the transfer case 17 in such a manner that it is free to rotate. It extends to the rear wheels, which are not shown on the figure. Meanwhile, the front end of the above-mentioned differential case 11 (at the left side of FIG. 2) projects somewhat from the bearing 15, and located on the case is a claw 25 for differential locking use. The sleeve 27 is spline-coupled to the outer circumference of the hollow shaft 1 at a position next to the claw 25 on the case. On the sleeve 27 there is another claw 29 opposite the claw 25 on the case. Since the sleeve 27 is forward of the differential case 11, it is easy for the transmission shift lever, which is also forward of the differential case 11 but is off of the figure and the differential lock lever, which operates the sleeve 27, to be gathered together in a single location.

Next, the operation of one particular example of the above-described embodiment of this invention will be explained.

The input from the engine, which is the drive device, is transmitted through the pinion shaft 3, the pinion gear 5 and the side gears 7a and 7b. One side gear drives the front wheel drive shaft 9, while the other side gear drives the rear wheel drive shaft 21 through the differential case 11, the drive gear 19 and the input gear 23. Thus power is distributed to the front wheels and the rear wheels, which are off of the figure. When a difference arises between the rotation rates of the front wheel drive shaft 9 and the rear wheel drive shaft 21, a force is produced between the side gear 7a which drives the front wheel drive shaft 9 and the side gear 7b which drives the rear wheel drive shaft 21, and the pinion gear 5 rotates to compensate for the difference. When a differential lock becomes necessary, the sleeve 27 is caused to slide by operation of the differential lock lever, which is located at the driver's seat off of the figure, and the claw 29 on the sleeve mates with the claw 25 on the case, causing the hollow shaft 1 to be locked to the differential case 11.

The application of this invention is not limited to the particular embodiment described above. For example, a chain could replace the gears 19 and 23 as the power transmission device.

As is clear from the above discussion, in the configuration of this invention, the rear wheel drive shaft is coupled to the differential case through a power transmission device, so the input which the drive device receives from the hollow shaft can be transmitted directly from the differential case to the rear wheel drive shaft through the pinion shaft, pinion gear and side gear. For this reason, it becomes an necessary to use an intermediate shaft in order to transmit power from the side gear to the rear wheel drive shaft, which shortens the length of the transfer case in the direction running from the front to the rear of the vehicle. Consequently, the total length of the transfer case can be shortened, which means that there are fewer restrictions on the design of other parts. In addition, the shortening of the transfer case leaves more room on the underside of the vehicle, improving performance in off-road operation which is the main purpose of the four wheel drive vehicle. The elimination of the intermediate shaft and shortening of the transfer case reduces the overall weight, which is a further advantage in off-road operation. The elimination of the intermediate shaft eliminates the need for the bearings which support it, reduces the number of parts, which makes assembly and parts supervision easier. At the same time, the front wheel drive shaft runs through the center of the hollow shaft, and by locating the rear wheel drive shaft above the front wheel drive shaft it becomes easier to maintain the height above ground of the rear wheel drive shaft, which extends a long distance to the rear of the vehicle. This is an additional advantage in off-road operation.

What is claimed is:

1. A device for the distribution of motive power comprising:
    a hollow shaft receiving input power from the drive device;
    a pinion shaft provided on the output side of said hollow shaft;
    a pinion gear rotatably supported on said pinion shaft;
    a pair of side gears meshed with said pinion gear;
    a front wheel drive shaft integrally coupled to one of said side gears and passing through the center of said hollow shaft;
    a differential case having an outer shell, a front and a rear end and being integrally formed with the outer side gear and enclosing said pinion shaft, pinion gear and side gears; a rear wheel drive shaft coupled to said differential case through a drive gear formed on the outer shell of the differential case and an input gear integrally connected to an end of said rear wheel drive shaft so as to mesh with the drive gear, said rear drive wheel drive shaft being located above said front wheel drive shaft.

2. A device for the distribution of motive power of claim 1, further comprising a transfer case which rotatably supports said rear wheel drive shaft and said differential case through bearings adjacent to said pinion shaft.

3. The device for the distribution of motive power of claim 1 further comprising:

a first claw provided on the front end of said differential case, a sleeve adjacent said first claw, said sleeve having mounted thereon a second claw opposite said first claw and a spline-coupled to the outer circumference of said hollow shaft, said sleeve being adapted to slide along said hollow shaft to make said claws of said sleeve and said differential case mate with each other by operation of a differential lock lever and cause said hollow shaft to be locked to said differential case.

* * * * *